3,306,867
TRANSFER MEDIA COMPRISING RESIN, CARRIER FLUID AND QUATERNARY AMMONIUM COMPOUND
Wladislas Popiolek, Harlow, Essex, England, assignor to Kores Manufacturing Company Limited, London, England, a British company
No Drawing. Filed Feb. 12, 1964, Ser. No. 344,231
7 Claims. (Cl. 260—23)

This invention relates to an improved copying paper and to its method of manufacture. More particularly, this invention relates to black, waxless copying papers comprising coatings of highly polar polymers, modified with quaternary ammonium compounds.

Copying papers currently employed are primarily of two types, with the more conventional papers employing a coating comprising a mixture consisting of waxes, oils, carbon black and fillers, which are applied to a carrier material as a hot melt. This type of coating gives a mark under pressure, by transfer at the areas of pressure of a complete mass of coating containing carbon black or other pigment. These wax based compositions suffer from various disadvantages when used on transfer papers, including softening when subjected to high temperatures, low tensile strength, and therefore, are highly susceptible to scuff and/or offset, and a tendency for the wax coatings to flake off the carrier sheet excessively in use. Furthermore, the mark obtained on the copy sheet, is prone to smudge and offset.

More recently "waxless" transfer compositions based on synthetic resins in place of waxes, were introduced. These materials have been favorably received, however, they still possess disadvantages. Thus, one representative resinous system is based on vinyl chloride and vinyl acetate polymers, as a substitute for the waxes, in conjunction with a non-volatile, non-drying oil, coloring matter, and a volatile solvent. The volatile solvent is evaporated after the composition is applied to a suitable carrier base to form a pressure sensitive transfer medium.

Although the hereinbefore described waxless system has numerous advantages over wax base copy papers when making blue copy papers, operable black carbon papers cannot be satisfactorily prepared solely from vinyl chloride resins. Thus, one skilled in the art attempting to incorporate carbon black in said vinyl chloride system, will discover that the resultant product has no transfer properties. As will be described more fully hereinafter, apparently the carbon black pigment is locked in by the polymer.

In an effort to overcome the shortcomings of the aforesaid waxless transfer papers based on a vinyl chloride system, the vinyl polymers have been modified with large amounts of acrylic polymers and small amounts of other modifying polymers, such as polystyrene and rubber latex. These modified vinyl compositions permit the incorporation of carbon black in waxless transfer coatings. Again, however, the compositions are not without shortcomings. Thus, the black copying papers based on the above system have low oil retentivity, and are relatively insensitive to pressure.

Accordingly, it is an object of the present invention to provide black waxless carbon paper having high oil retentivity.

It is another object of the instant invention to provide black waxless carbon papers which are highly sensitive to pressure.

It is another object of this invention to provide black waxless carbon papers based solely on polar vinyl polymers.

It is another object of this invention to provide improved waxless carbon papers having a quaternary ammonium compound incorporated therein.

These and other objects of the invention will become more readily apparent from the following detailed description with particular emphasis being placed on the preferred embodiments of the examples.

According to the present invention, a copying paper is prepared from a polymeric system, containing the required transfer material and modified with a quaternary ammonium compound. The inclusion of the quaternary ammonium compound permits the preparation of pigmented copy papers employing polar vinyl and vinylidene polymers, resinous polycarbonates, and the like, as the sole polymeric material. The resultant copy papers have high oil retentivity, are extremely sensitive to pressure, do not flake and are very clean to handle.

While the invention is not to be limited by theoretical considerations, it is theorized that the facility of making waxless carbon papers depends to a large extent on the polarity of the polymer used as the basis for the transfer coating. The higher the polarity of the polymer, the more difficult it is to make carbon coatings. This difficulty of preparing transfer papers is particularly enhanced with regard to manufacture of typewriter carbons (as distinct from pencil carbons), especially those based on compositions containing carbon black. The problem encountered with compositions containing carbon black is apparently due to the peculiar characteristics of carbon blacks employed in transfer papers. Thus carbon blacks are pigments based on carbon having a particle size in the colloidal range, which is considerably smaller than the particle size of normal pigments. The colloidal particles, which are porous in nature, greatly extending their total surface area, are held together by strong cohesive forces, resulting in ready agglomeration of the particles. Carbon blacks, with the different types for use in copy papers numbering over fifty, all have high sorbing power, with most being more or less hydrophyllic due to the chemisorption of oxygen on the surface of the particles of pigment. The chemisorbed oxygen is a result of a special oxidizing process carried out to provide carbon blacks with better wettability in polar vehicles and consequently better flow properties.

In the vinyl chloride and vinylidene chloride polymers, the high polarity is believed due to the chlorine atoms distributed along the polymer backbone, with high polarity being especially evident when the polymers are in solution and the chlorine atoms in the molecules are readily accessible to any compound which may also be present in a dissolved or finely dispersed form. Since waxless carbon papers preferably prepared by dissolving the polymer in a suitable volatile solvent, and thereafter, adding the other components, such as finely ground or dissolved coloring matter and non-volatile oils, it is clear why the polarity of a polymer in solution, as opposed to the polarity of a polymer in solid form, is critical. Thus, when a highly polar polymer and a highly adsorbent pigment, such as carbon black, are used in a transfer composition, it is impossible to obtain a microscopic sponge-like structure from which the pigment, dispersed in the non-volatile non-drying oil, can be squeezed out under impact or pressure because the carbon black is too strongly sorbed onto the highly polar groups along the polymer chains. Therefore, special means are necessary to counteract or neutralize the effect of this high polarity.

Apparently, the presence of an acrylic polymer and/or other modifying polymers lowers the average polarity of all of the polymers in the composition, as a whole, relative to that of the vinyl polymer. Therefore, coating compositions containing acrylic polymers with the vinyl polymers permit the preparation of operable, pigmented, waxless coating compositions for use on transfer papers. As noted hereinbefore, however, such modified compositions possess various disadvantages including low oil retentivity and poor pressure sensitivity.

The quaternary compounds employed herein have at least one outstanding characteristic, namely their ability to be sorbed on to solid surfaces. They are held in place by strong chemical forces, the polar nitrogen group being absorbed on to the polar centers on the surface of the solid and the hydrocarbon group is oriented outwards. In the case of the present waxless coatings the solid surface comprises the pigment particles and the polymer. The polar groups of the quaternary compounds are sorbed on to the polar centers of the polymer and of the pigment and the non-polar fatty chains are oriented towards the vehicle. Thus a new surface, which is much more easily wetted by the oil, is offered to the vehicle. This makes the pigment readily dispersible in the oily vehicle and prevents it from being sorbed on to the polar sites of the polymer. In this way, the carbon black or other adsorbent pigment is kept colloidally dispersed in the vehicle and therefore readily released upon application of pressure.

The quaternary ammonium compounds which can be employed to modify the compositions of the present invention include those of the formula

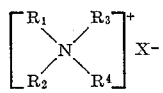

as well as compounds which are substantially similar to the true quaternary compounds, such as alkyl pyridinium salts, exemplified by the formula

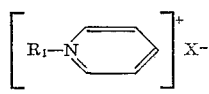

wherein $R_1$, $R_2$, $R_3$, and $R_4$ are straight or branched carbon to carbon chains of from 1 to 26 carbon atoms and X is a conventional anion derived from an organic or inorganic acid, including halides, sulfates, sulfonates, and acetates. It has been found, however, that compounds having at least one relatively bulky hydrocarbon molecule attached to the nitrogen, such as a $C_8$ to $C_{24}$ chain are particularly effective. Normally, and preferably, not more than two of the members selected from the group consisting of $R_1$, $R_2$, $R_3$, and $R_4$ will contain more than 6 carbon atoms.

Although all of the aforementioned compounds are effective in the present invention, materials having the formula

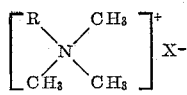

wherein R is a straight or branched chain having from 12 to 18 carbon atoms, are particularly desirable from the standpoint of availability, compatibility with other components of the transfer composition, performance and ease of handling.

The polymers employed as the basis of the waxless copy papers, of the present invention are preferably the polar vinyl polymers, such as homo- and copolymers of vinyl chloride and vinyl acetate. Especially suitable copolymers contain from about 83 to 87% vinyl chloride and from about 17 to 13% vinyl acetate. Additionally, copolymers of vinyl chloride and vinylidene chloride, preferably containing about 60% vinyl chloride and 40% vinylidene chloride are eminently suitable. However, the inclusion of quaternary ammonium compounds enhances the properties of transfer papers based on other synthetic resins, such as cellulose acetate, cellulose acetate butyrate, ethyl cellulose, polymethyl methacrylate, polymethylacrylate, polystyrene, polyvinyl butyral, polyvinyl acetate, copolymers of monomer used in the polymers noted above, and polymethylstyrene as well as the condensation type polymers such as polycarbonates and mixed polycarbonates (e.g. those of the following structural formula:

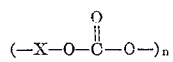

wherein X is an alkylene or substituted alkylene, cycloalkylene or arylene group or a combination of two or more of these groups with compounds being preferred wherein the alkylene groups contain from 1–7 carbon atoms and arylene is phenylene, and $n$ is a whole number of from 40 to 400 to provide a polycarbonate or mixed polycarbonate capable of forming a film and which is soluble in a volatile organic liquid preferably boiling below 130° C.), alkyd resins, such as polymers of phthalic acid and ethylene glycol, polyesters of ethylene glycol and terephthalic acid, and of ethylene glycol and isophthalic acid and the thermoplastic epoxy resins, such as condensation products of epichlorohydrin and polyhydroxy compounds such as 2,2 bis (4 hydroxyphenyl) propane. The above list is not complete, and those skilled in the art will appreciate from the above noted compounds, other types of thermoplastic resins which can be employed. Although the quaternary ammonium compounds of the instant invention will provide enhanced results in any resinous system, the greatest improvement, as noted hereinbefore, is in compositions where the resin base is a highly polar material.

The image forming material will comprise a marking material and a non-volatile, non-drying fluid which will provide a suspending or dissolving medium for the marking material. The marking material can be a colored pigment, dye or a colorless color forming dye intermediate which will react with a co-reactant when brought into contact with it to produce a colored finish. The distinction between pigments and dyes is often difficult to ascertain. However, as used herein, a pigment is considered to be a colored, or color forming substance which is insoluble in the marking fluid. Examples of pigments which may be employed are carbon blacks, iron blues, phthalocyanines, cadmium reds, ultramarine blues, phospho- and molybdotungstic acid laked colors. A dye or dye former, as used herein, is a colored or color forming compound soluble in the marking fluid. Among the dyes and dye formers which may be employed are triphenylmethane, e.g., malachite green and crystal violet, azo dyes, diazonium salts, indigoid dyes, phthalocyanine dyes, anthraquinone dyes, acridine dyes, azine dyes, oxazine dyes, thiazine dyes, and thioindigoid dyes.

As noted hereinbefore, the quaternary ammonium compounds of the instant invention, provide the most noteworthy effects when a highly adsorbent pigment, such as carbon black, is used in the transfer composition, which pigment is strongly sorbed onto a polar polymer. Even though this is the case, improved transfer compositions are obtained when using less adsorbent pigments and dyes.

The non-volatile, non-drying carrier fluid for the coloring matter is preferably a vegetable or animal oil. However, other materials can be employed, such as oily fatty alcohols and acids. It is only necessary that the non-volatile diluent not be deleterious to the composition or effect the color. Plasticizers can be included in the composition including butyl stearate, dioctyl phthalate and other phthalates, tricresyl and trioctyl phosphates, adipates, azelates, and sebacate ethers, methyl acetyl ricinolate, sperm oil, tetrahydrofurfuryl oleate, etc.

It is not necessary to employ fillers in the presently described carbon coatings. However, fillers do perform useful functions such as helping to shape the porous structure by acting as a "backbone" to, and preventing premature collapse of the pores, as well as in helping the oil retention of the micro-porous structure as a whole, and thus, decreasing oil bleed. Preferred embodiments of the instant invention, therefore, include the presence of fillers. Fillers, when used, are preferably finely divided, and possess a particle size of less than about 150 mesh, with enhanced results being obtained when the mesh size is less than about 300, and optimum properties being obtained when the mesh size is less than 600. Mesh size, as employed herein, refers to the Tyler scale. Silicate fillers such as china clay, mica, burnt umber, are highly practical. Other inorganic fillers that can be used include calcium sulfate, titanox, talc, barium sulfate, diatomaceous earth and the like.

The improved transfer papers, according to the present invention, can be made from compositions having considerable variation in the amounts of the different materials. Thus, the ratio of polymer to coloring matter, oil, and quaternary ammonium compound can vary over substantial ranges. However, it has been found that the percentages set forth in the following table provide improved results. It is to be understood, however, that modifications in these ranges can be made and still fall within the scope of the present invention.

TABLE.—PERCENT BY WEIGHT OF COMPOSITION

|  | Preferred | Optimum |
| --- | --- | --- |
| Polymer | 20–40 | 25–30 |
| Coloring Matter | 10–35 | 20–30 |
| Oil | 30–60 | 30–45 |
| Quaternary NH$_3$ cpd | 0.5–5.0 | 1–3 |
| Filler | 0–15 | 5–12 |

In making transfer papers according to the present invention, the waxless coating composition is applied to a suitable carrier which may be a transfer sheet, ribbon, tape or the like, to form a pressure responsive transfer layer. If desired, an intermediate bonding layer can be interposed between the carrier and transfer layer. The bonding layer can be transparent, opaque, plasticized or unplasticized, containing fillers and/or pigments or not. The intermediate layer, in addition to bonding the transfer layer to the carrier sheet, can serve to reinforce the base material which can be a very thin tissue or plastic film. The reinforcement is of particular value when making a carbon paper for special heavy duty application, such as for use with an electric typewriter. The carrier sheet, ribbon, tape or the like, can be paper, textile fabric made of synthetic or natural fibers, flexible plastic foils, such as regenerated cellulose or a polymer layer, such as polyethylene, polyethylene terephthalate, polypropylene, polyvinyl chloride, and condensation polymers, whereas the bonding layer is usually based on a synthetic polymer, such as polyvinyl acetate, polyvinyl acetal, polyvinyl chloride, or the like.

The transfer coating composition of the present invention can be applied to the carrier by known methods. In the preferred method the components of the transfer composition are dispersed or dissolved in a volatile organic liquid, the function of which is to serve as a solvent for the polymer and oil, as a dispersion medium for the filler, if present, and a solvent or dispersion medium for the coloring matter and the quaternary ammonium compound. The coloring matter can comprise materials which are soluble in the volatile organic liquid as well as materials which are insoluble. The resultant solution or dispersion of the coating material is applied to a carrier base with subsequent solidification of the coating by evaporation of the solvent. Sufficient heat may be aplied to the carrier and coating composition to increase the removal of the volatile liquid from the coating if desired. Volatile solvents which can be used include methylene chloride, methyl ethyl ketone, methyl isopropyl ketone, ethyl acetate and butyl acetate. Methylene chloride is the preferred volatile fluid.

In order that those skilled in the art may better understand how to practice the present invention, the following examples are set forth. These examples are presented by way of illustration and not by way of limitation since there are many forms of the invention, other than these specifically embodied. In the examples, parts are by weight unless specifically indicated otherwise.

*Example I*

28 parts of a copolymer of vinyl chloride and vinyl acetate, consisting of 85% vinyl chloride and 15% vinyl acetate, were dissolved in 300 parts methylene chloride. 30 parts oleyl alcohol, 8 parts butyl stearate, 20 parts finely divided carbon black, 6 parts turkey burnt umber, 5 parts fanal blue, 3 parts violet lake toner and 2 parts oleyl dimethyl ethyl ammonium ethyl sulfate were ground together and thereafter added to the polymer solution with stirring. The dispersion/solution of coating composition was applied to a paper carrier by means of a doctor's blade, and heated air was blown over the coating to drive off the volatile methylene chloride. The resultant black copy paper had a high oil retentivity, was extremely sensitive to pressure with no tendency for the coating to flake off.

*Example II*

20 parts of a copolymer of vinyl chloride and vinyl acetate consisting of 85% vinyl chloride and 15% vinyl acetate were dissolved in 300 parts methylene chloride. 36 parts oleyl alcohol, 16 parts finely divided carbon black, 10 parts burnt shale, and 0.4 part lauryl dimethyl benzyl ammonium chloride were ground together and thereafter, stirred into the polymer solution. The resultant coating composition was applied to a thin film of polyethylene terephthalate coated with a bonding layer of polyvinyl formed by means of a doctor blade and heated air was blown over the coating to drive off the volatile methylene chloride. The resultant transfer paper was very durable, had high oil retentivity, was extremely sensitive to pressure and the waxless coating showed no tendency to flake off.

*Example III*

33 parts of a copolymer of vinyl chloride and vinyl acetate consisting of 85% vinyl chloride and 15% vinyl acetate were dissolved in 300 parts methylene chloride. 13 parts oleyl alcohol, 13.5 parts ground nut oil, 10 parts butyl stearate, 18 parts finely divided carbon black, 7 parts turkey burnt umber, 4 parts [Fastel Blue LK] and 1.5 parts oleyl dimethyl ethyl ammonium ethyl sulfate were ground together and stirred into the polymer solution. The resultant dispersion/solution of coating composition was applied to a film of polyethylene terephthalate coated with a bonding layer of polyvinyl formed with a doctor blade. The volatile methylene chloride was evaporated from the coating by blowing heated air over the coating. The resultant copy paper was smudgeless, had high oil retentivity, was sensitive to pressure, and the coating composition had no tendency to flake off.

*Example IV*

A transfer coating was made as in Example III, with the exception that the turkey burnt umber filler was omitted. An excellent transfer paper was obtained, however, the structure did not possess quite the same degree of rigidity as the structure of Example III, which employed a filler.

Example V

A carbon paper was prepared as set forth in Example II above, except that the burnt shale filler was omitted from the composition. An excellent transfer paper was obtained, however, the coating did not possess quite the degree of structural rigidity as the copy paper of Example II containing the filler.

Example VI 32 parts of a copolymer of vinylidene chloride and vinyl chloride consisting of 40 parts vinylidene chloride and 60 parts vinyl chloride were dissolved in 300 parts methylene chloride. 13 parts oleyl alcohol, 13 parts ground nut oil, 10 parts butyl stearate, 18 parts finely divided carbon black, 8 parts turkey burnt umber, 4 parts Fastel Blue LK and 2 parts oleyl dimethyl ethyl ammonium ethyl sulfate were ground together and thereafter stirred into the polymer solution. The resultant dispersion/solution of coating composition was applied to a paper base with a suitable doctor blade. Evaporation of the methylene chloride solvent was facilitated by blowing heated air over the coating. The resultant transfer paper was extremely clean to handle, being smudgeless, and possessed a high oil retentivity. The paper was highly sensitive to pressure and the coating had no tendency to flake off.

Example VII

A transfer paper was made substantially as in Example VI, except that the oleyl dimethyl ethyl ammonium ethyl sulfate was replaced by lauryl dimethyl benzyl ammonium chloride. The compositions had substantially the same properties as Example VI.

Example VIII

A transfer paper was prepared substantially as in Example VI except that ½ of the copolymer of vinylidene chloride and vinyl chloride, i.e., 16 parts, was replaced by 16 parts of a copolymer of vinyl chloride and vinyl acetate consisting of 85% vinyl chloride and 15% vinyl acetate. An excellent transfer paper was obtained.

Example IX 25 parts of the polycarbonic acid ester of 2,2 bis (4 hydroxyphenyl) propane having the structural formula,

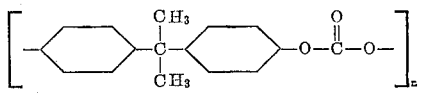

wherein $n$ is 100 to 300, were dissolved in 300 parts methylene chloride. 26 parts castor oil, 17 parts dioctyl adipate, 13 parts finely divided carbon black, 4.2 parts reflex blue, 13.9 parts calcium sulfate and 0.9 part octadecyl carboxymethyl trimethylammonium chloride were uniformly admixed by grinding and thereafter stirred into the polymer solution. The coating composition was applied to a carrier sheet by means of a roller. The volatile solvent was removed by gently blowing heated air over the carrier sheet. The resultant transfer sheet was extremely clean to handle, being smudgeless, possessed high oil retentivity, was sensitive to pressure and the coating had no tendency to flake off.

Example X 20 parts of the polycarbonate resin described in Example IX were dissolved in 300 parts methylene chloride. 17.4 parts arachis oil, 22 parts dioctyl sebacate, 12.8 parts finely divided peerless carbon black, 12.8 parts iron blue, 12.8 parts turkey burnt umber, and 2.2 parts oleyl dimethyl ethyl ammonium ethyl sulfate were intimately admixed by grinding before stirring into the polymer solution. The coating composition was applied to a carrier sheet by means of a roller. The volatile solvent was removed by blowing heated air over the carrier sheet. The resultant transfer paper was extremely clean to handle, being smudgeless, and possessed a high oil retentivity. The paper was highly sensitive to pressure and the coating had no tendency to flake off.

As set forth hereinbefore, the present invention is concerned primarily with waxless carbon papers prepared from highly polar polymers and carbon black. However, the incorporation of a quaternary ammonium compound in a coating composition also provides enhanced results when preparing blue waxless carbon papers. Thus, Example XI is an example of such paper.

Example XI 30 parts of a copolymer of vinyl chloride and vinyl acetate, consisting of 85% vinyl chloride and 15% vinyl acetate were dissolved in 300 parts methylene chloride. 40 parts oleic acid, 5 parts butyl stearate, 6 parts phthalocyanine blue, 6 parts reflex blue, 10 parts calcium sulfate, and 3 parts oleyl dimethyl ethyl ammonium ethyl sulfate were ground together and thereafter, stirred into the polymer solution. The transfer composition was applied to a carrier sheet by means of a roller. The volatile solvent was removed by blowing heated air over the carrier sheet, the vapors being drawn off by fans. The resultant transfer sheet was extremely clean to handle, being smudgeless, possessed high oil retentivity, was extremely sensitive to pressure and the coating had no tendency to flake off.

While various modifications of this invention are described, it should be appreciated that the invention is not restricted thereto, but that other embodiments will be apparent to one skilled in the art which will fall within the scope and spirit of the invention and appended claims.

In Examples I and IV-XI the carrier is preferably coated with a bonding layer prior to application of the transfer coating.

It is claimed:

1. In a pressure transferable ink composition for pressure operative transfer media comprising 20-40 percent of a polymer base material, 10-35 percent coloring matter, and 30-60 percent of a non-volatile, non-drying carrier fluid for the coloring matter, the improvement of incorporating from 0.5-5 percent of a quaternary ammonium compound in said ink, whereby the coloring matter is more readily released.

2. The ink composition of claim 1, wherein the quaternary ammonium compound contains at least one $C_8$-$C_{24}$ hydrocarbon radical.

3. The ink composition of claim 1, wherein the polymer base material is a polymer selected from the group consisting of the homopolymer of vinyl chloride and the copolymer of about 60 percent vinyl chloride and about 40 percent vinylidene chloride.

4. The ink composition of claim 1, which contains from 5-12 percent filler.

5. A pressure sensitive transfer member comprising an impression transmitting carrier having on a surface thereof an adherent film of pressure transferable ink, comprising 20-40 percent of a polymer base, 10-35 percent coloring matter, 30-60 percent of a non-volatile, non-drying fluid medium for said coloring matter and from 0.5-5 perecent of a compound of the formula

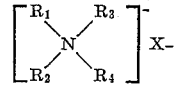

wherein $R_1$ is an alkyl radical of from 8-24 carbon atoms, $R_2$, $R_3$, and $R_4$ being selected from the group consisting of (1) each a hydrocarbon radical of 1-6 carbon atoms and (2) the necessary atoms to form a pyridine ring, and X is an anion of an acid.

6. The pressure sensitive transfer member of claim 5, wherein the polymer base is a copolymer of about 83-87 percent vinyl chloride and about 13-17 percent vinyl acetate.

7. The pressure sensitive transfer member of claim 5, wherein the polymer base is a polycarbonate.

References Cited by the Examiner

UNITED STATES PATENTS 3,117,018   1/1964   Strauss _____ 260—23

OTHER REFERENCES

Kirk et al., "Encyclopedia of Chemical Technology", vol. 9 (1952), pages 593 and 594 and vol. 11 (1953), pp. 377 and 382, copy in S.L., TP9E68.

Noller, "Chemistry of Organic Compounds", 1957, pages 229 and 621, copy in S.L., QD253 N65 C3.

LEON J. BERCOVITZ, *Primary Examiner.*

R. A. WHITE, *Assistant Examiner.*